United States Patent [19]

Rowarth

[11] 4,441,676
[45] Apr. 10, 1984

[54] FORCE CONTROL MEMBER ASSEMBLIES

[75] Inventor: Ralph Rowarth, Brough, England

[73] Assignee: British Aerospace Public Limited Company, London, England

[21] Appl. No.: 302,086

[22] Filed: Sep. 14, 1981

[30] Foreign Application Priority Data

Sep. 27, 1980 [GB] United Kingdom ............... 8031297

[51] Int. Cl.³ .............................................. B64C 13/46
[52] U.S. Cl. .................................. 244/234; 244/236; 74/471 XY
[58] Field of Search .................. 244/234, 236, 237; 74/471 XY; 200/6 A, 157; 267/150

[56] References Cited

U.S. PATENT DOCUMENTS

| 2,397,978 | 4/1946 | Paulus et al. ................. 244/236 |
| 3,522,744 | 8/1970 | Johnson . |
| 3,550,466 | 12/1970 | Ham .................. 200/6 A |
| 3,707,093 | 12/1972 | Worden . |
| 3,771,037 | 11/1973 | Bailey, Jr. ................ 244/237 |
| 3,835,270 | 9/1974 | Dufresne . |
| 3,899,934 | 9/1975 | Froumajou . |

FOREIGN PATENT DOCUMENTS 1327175 8/1973 United Kingdom .
1423332 2/1976 United Kingdom .
2039007 7/1980 United Kingdom .

Primary Examiner—Trygve M. Blix
Assistant Examiner—Ivy M. Shum
Attorney, Agent, or Firm—Cushman, Darby & Cushman

[57] ABSTRACT

A force control member assembly 1 comprises a force control member unit 2 carried by an intermediate member 3, the intermediate member 3 itself being attached to a fixed bracket 4 by pivot means 5 allowing resilient movement of the intermediate member 3 with respect to the fixed bracket 4 about pitch and roll axes as shown at 6. The force control member unit 2 includes a force control member and force transducer means associated therewith to generate force control signals related to control forces applied to the force control member. In use, when a control force is applied to the control member, a force control signal will be generated simultaneously with a significant displacement of the intermediate member with respect to the fixed member. The intermediate member will return to a median position on removal of a control force; this imparts a 'feel' characteristic to the assembly.

8 Claims, 11 Drawing Figures

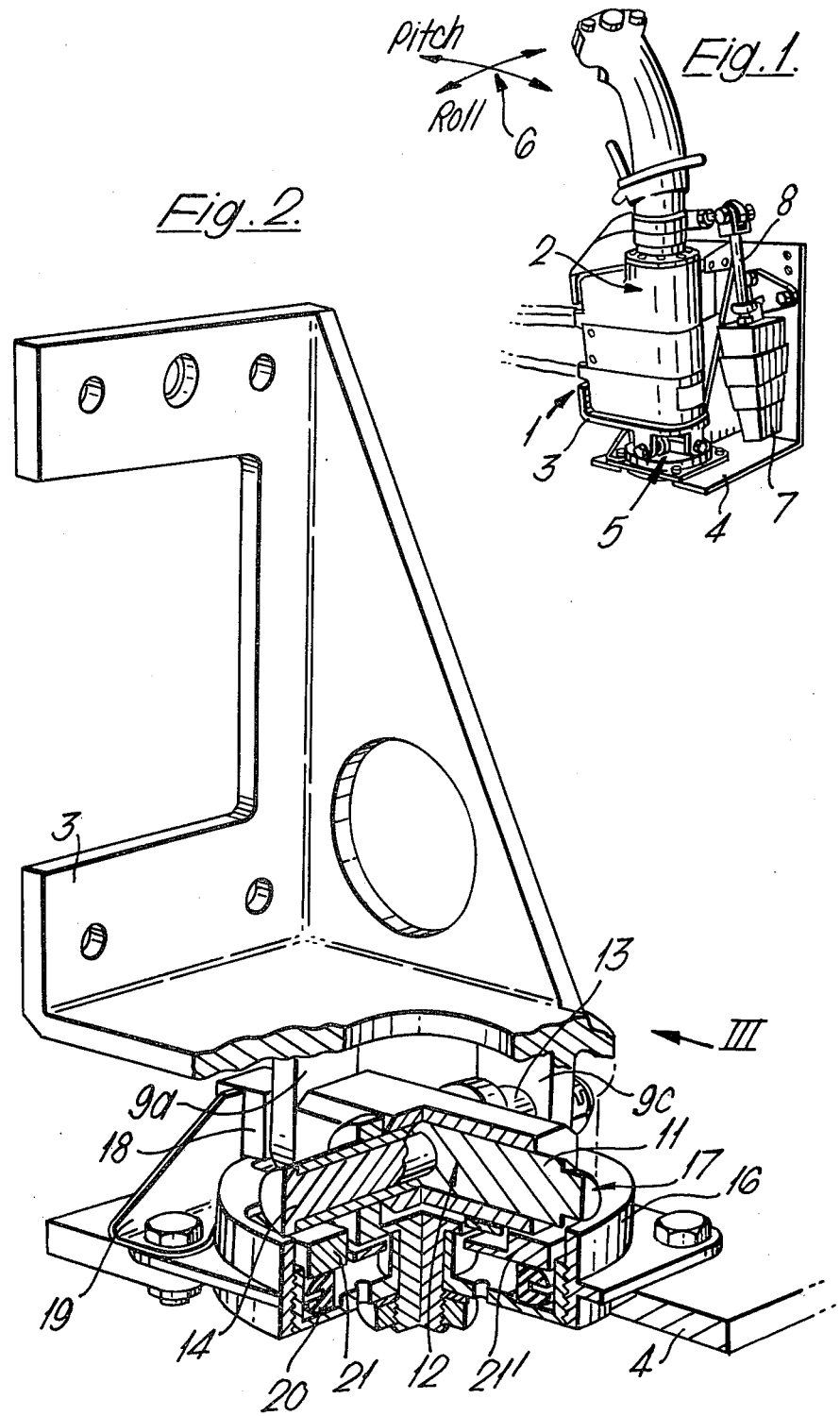

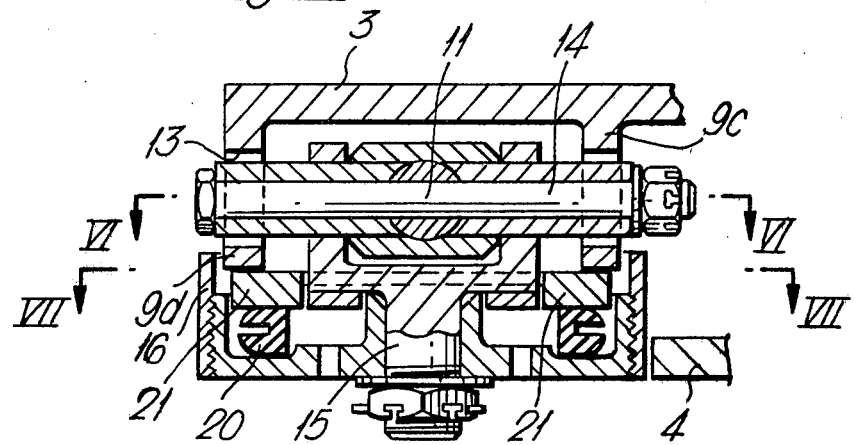
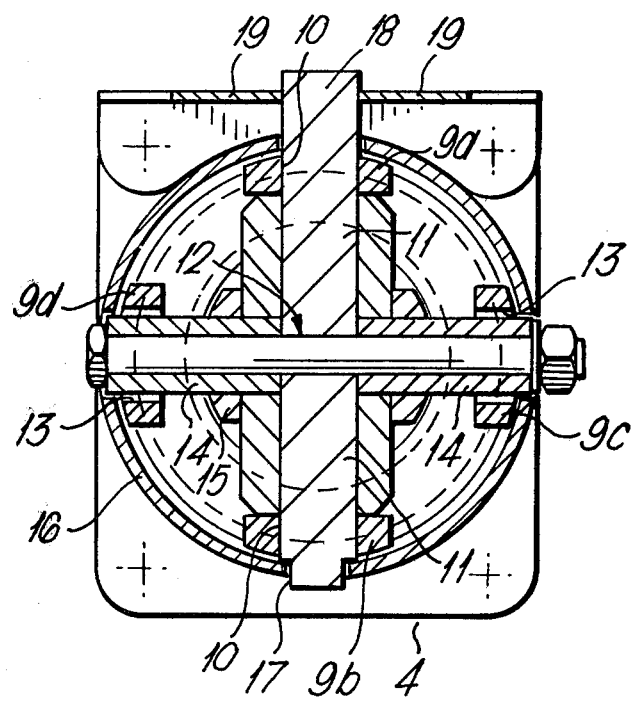

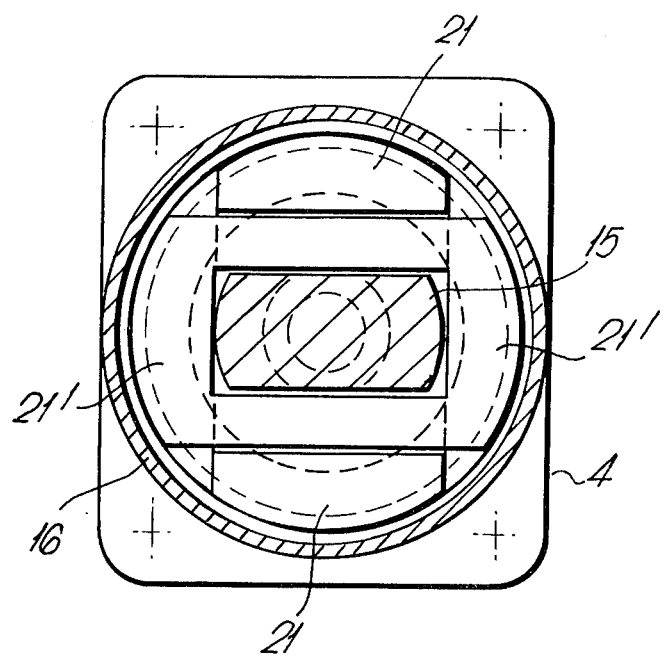

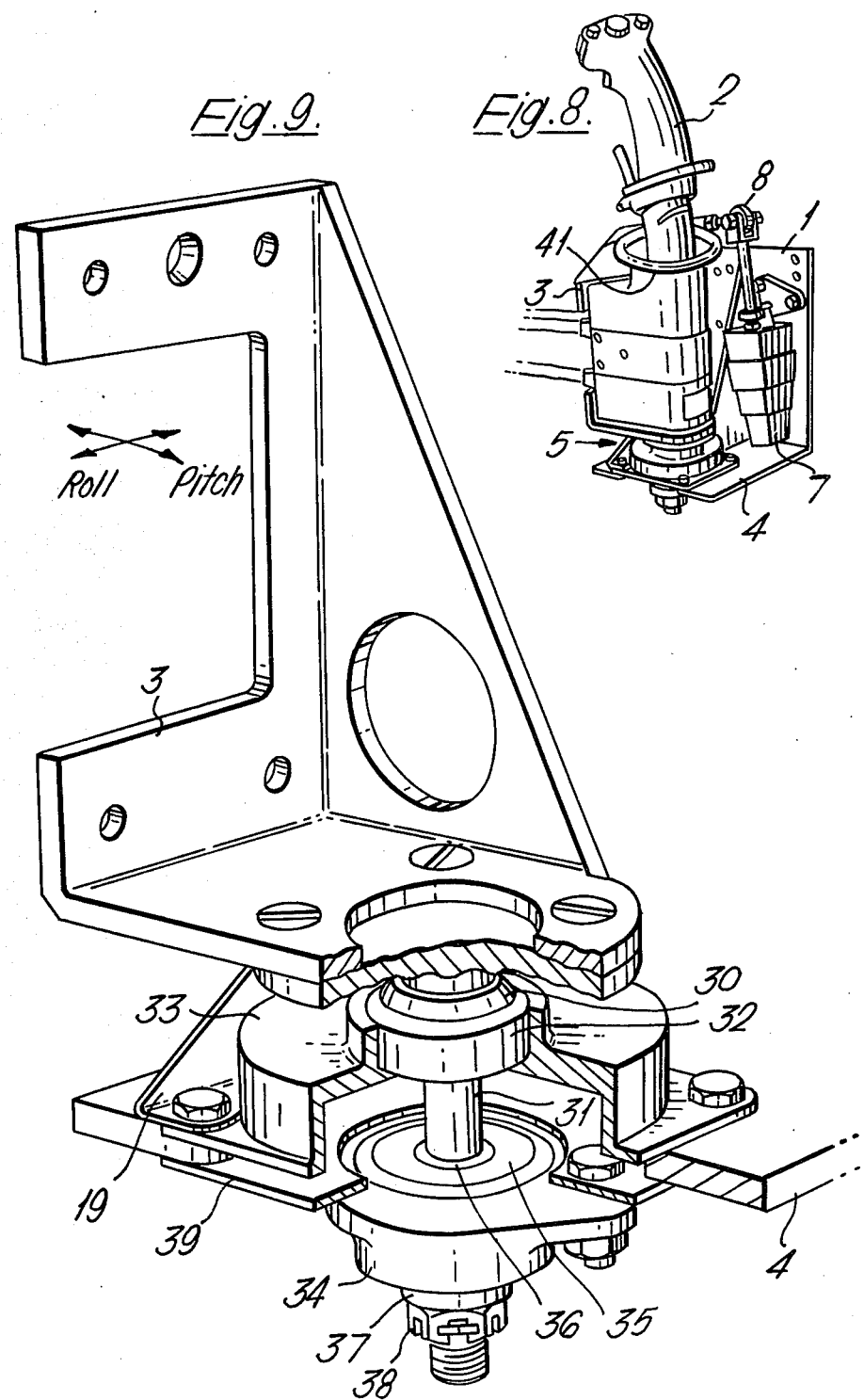

FORCE CONTROL MEMBER ASSEMBLIES

This invention relates to force control member assemblies which emit force control signals relates to control forces applied to the force control member.

Such control member assemblies are often in the form of a force control member unit which comprises a force control member having force sensitive transducer means associated therewith. In operation, a control force supplied to the control stick causes the transducer means to produce a signal but causes only a small displacement of force of the force control member with respect to the body of force control member unit. Such a form of control member assembly will hereinafter be referred to as "a force control member unit of the type described".

It is therefore an aim of this invention to provide a force control member assembly in which a control force applied to the force control member not only causes a force control signal to be emitted, but also causes a significant displacement of the force control member.

It is a further aim of this invention to provide an assembly in which positive self-centering of the force control member is inherent.

Yet a further aim of this invention is to provide an assembly in which a proportional reaction to any such significant displacement is included so that the force control member has a 'feel' characteristic.

According to this invention, there is provided a force control member assembly which includes a force control member unit, an intermediate member and a fixed member for rigid attachment to a fixed structure, the force control member unit including a force control member and force transducer means associated with the force control member for generating signals related to control forces applied to the member, the intermediate member carrying the force control member and being attached to the fixed member by mounting means allowing resiliently-restrained movement of the intermediate member about a median position whereby on application of a control force to the force control member a force control signal is generated simultaneously with a significant displacement of the intermediate member relative to the fixed member, the intermediate member returning to its median position when the control force is removed. The mounting means allow positive self-centering of the force control member and also provide a 'feel' characteristic for the assembly.

The mounting means preferably includes pivot means pivotally coupling the intermediate member to the fixed member and a resilient member adapted to be distorted on pivotal displacement of the intermediate member from its median position.

Advantageously, the pivot means allows pivotal movement of the intermediate member about two orthogonal axes but prevents twisting movement about the third orthogonal axis.

In one embodiment, the pivot means includes a cruciform member mounted on the fixed member for turning movement about an axis, the cruciform member carrying the intermediate member for turning movement about an orthogonal axis.

In an alternative embodiment, the pivot means includes a spherical bearing arrangement.

In either embodiment, the resilient member conveniently comprises a ring of elastomeric material attached to the fixed member and adapted to be compressed on displacement of the intermediate member from its median position.

In both embodiments, stop means are preferably included to limit control movement of the force control member with respect to the fixed member.

By way of example only, two specific embodiments of force control member assembly constructed in accordance with this invention will now be described in detail, reference being made to the accompanying drawings in which:

FIG. 1 is a pictorial view of a first embodiment of force control member assembly of this invention;

FIG. 2 is a further pictorial view of the embodiment of FIG. 1 on a larger scale and with certain parts removed or cut-away for clarity;

FIG. 5 is a sectional view taken on line V—V of FIG. 4;

FIG. 6 is a sectional view taken on line VI—VI of FIG. 5;

FIG. 7 is a sectional view taken on line VII—VII of FIG. 6;

FIG. 8 is a pictorial view of a second embodiment of force control member assembly of this invention;

FIG. 9 is a further pictorial view of the embodiment of FIG. 8 on a larger scale and with certain parts removed or cut away for clarity;

Figure 3:
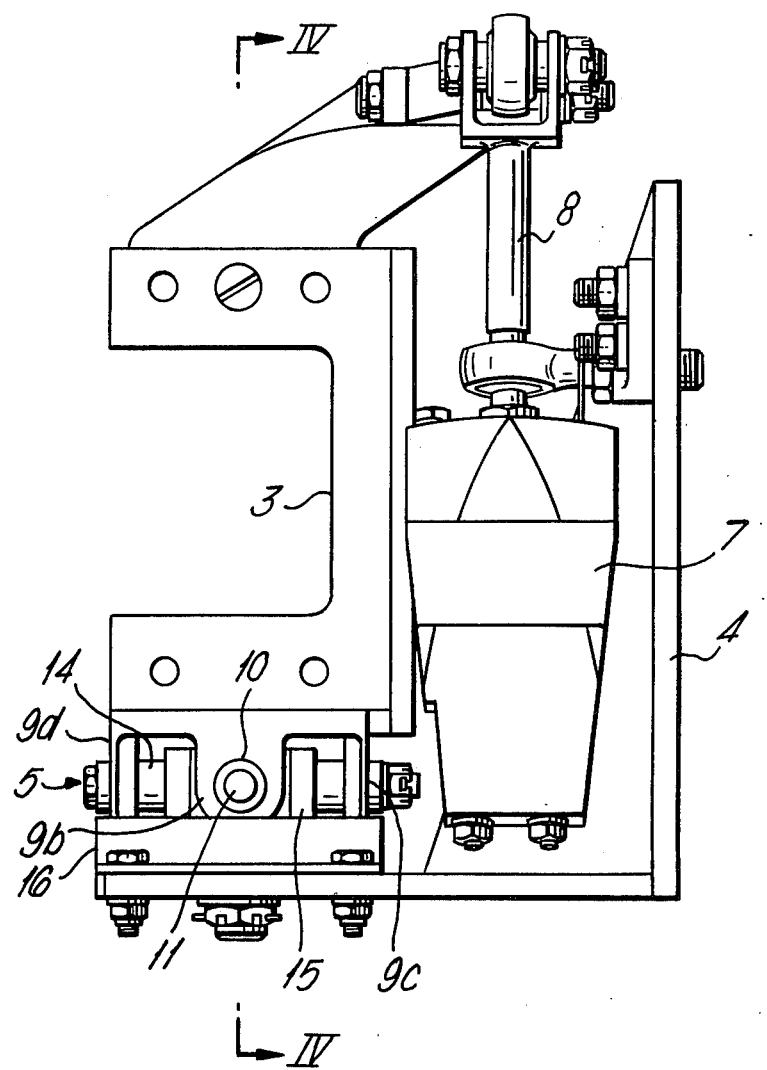
FIG. 3 is an end elevation in the direction of arrows III of FIG. 2.

The embodiments of force control member assembly illustrated in the Figures are intended to be employed in an aircraft to replace the conventional form of control stick. Each embodiment includes a force control stick unit which converts a control force applied to the force stick into an electrical signal by means of a force transducer associated with the stick. The signal generated is then processed to actuate one or more of the control surfaces of the aircraft. When the control force is applied to the control stick, the control stick is displaced by a small amount with respect to the body of the unit and the control force imparts a torque to the force control stick unit. Although the two embodiments of the invention are described with specific reference to hand-operated force control stick units for use in aircraft, it will be understood that force control member assemblies of the invention may be adapted to be operated by the feet of a user, for example, to effect control of the rudder of an aircraft. The invention may also find applications elsewhere than in aircraft.

Referring initially to FIG. 1, there is shown a first embodiment of force control stick assembly 1 which comprises a force control stick unit 2 carried by a control support bracket 3, the control support bracket 3 being pivotally attached by a pivotal coupling 5 to a fixed support bracket 4 fixed to or part of the aircraft structure. The force control stick unit 2 is angularly displaceable about the pivotal coupling 5 in both pitch and roll planes as indicated at 6. In order to combat significant inertia effects to which the force control stick unit 2 and its support bracket 3 may be subject when the aircraft is in motion, the assembly 1 incorporates a counterbalance inertia weight 7 pivotally attached to the fixed support bracket 4 and interconnected by links 8 to the control support bracket 3.

Figure 4:
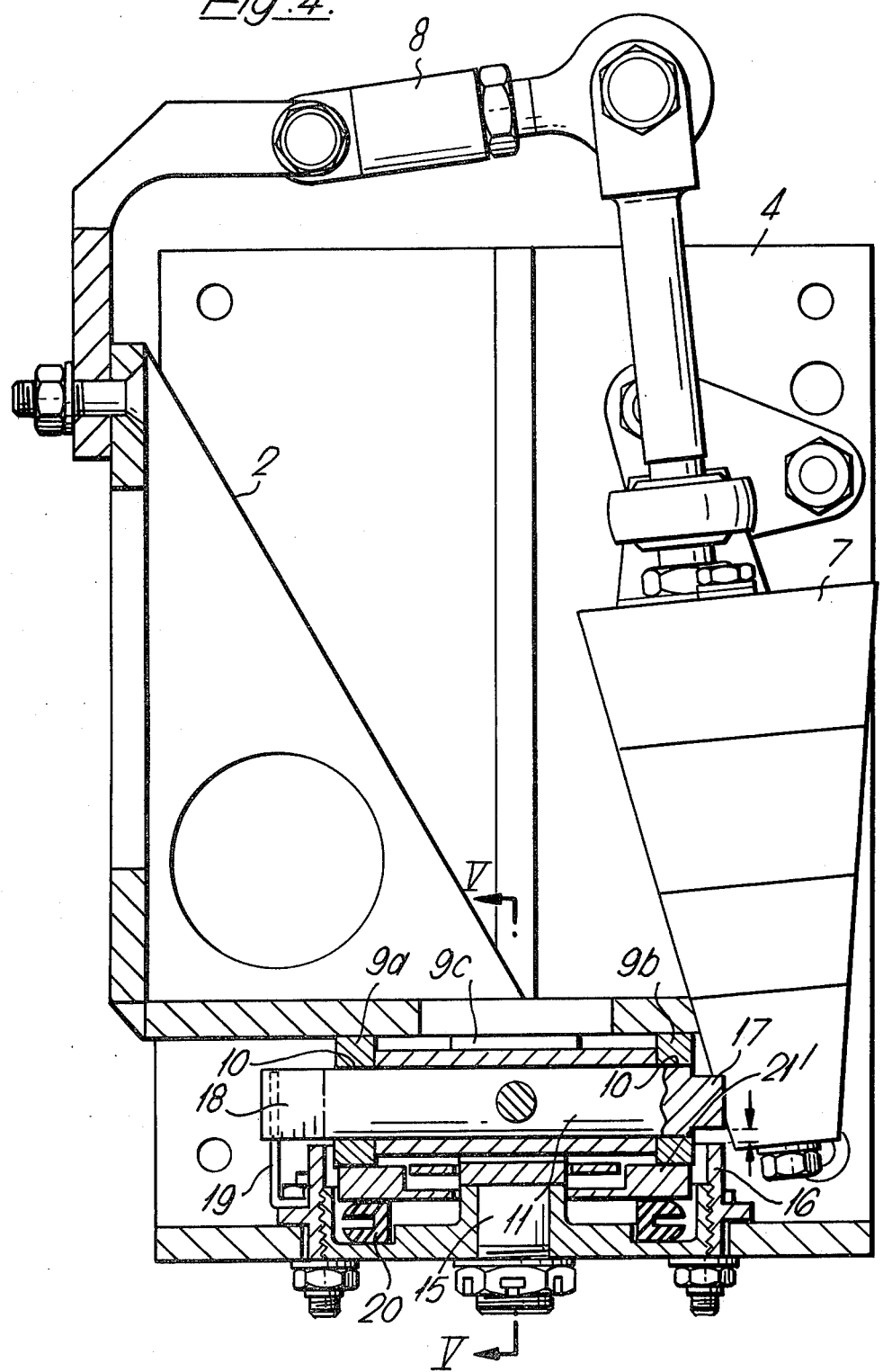
FIG. 4 is a sectional view taken on line IV—IV of FIG. 3.
Figure 10:
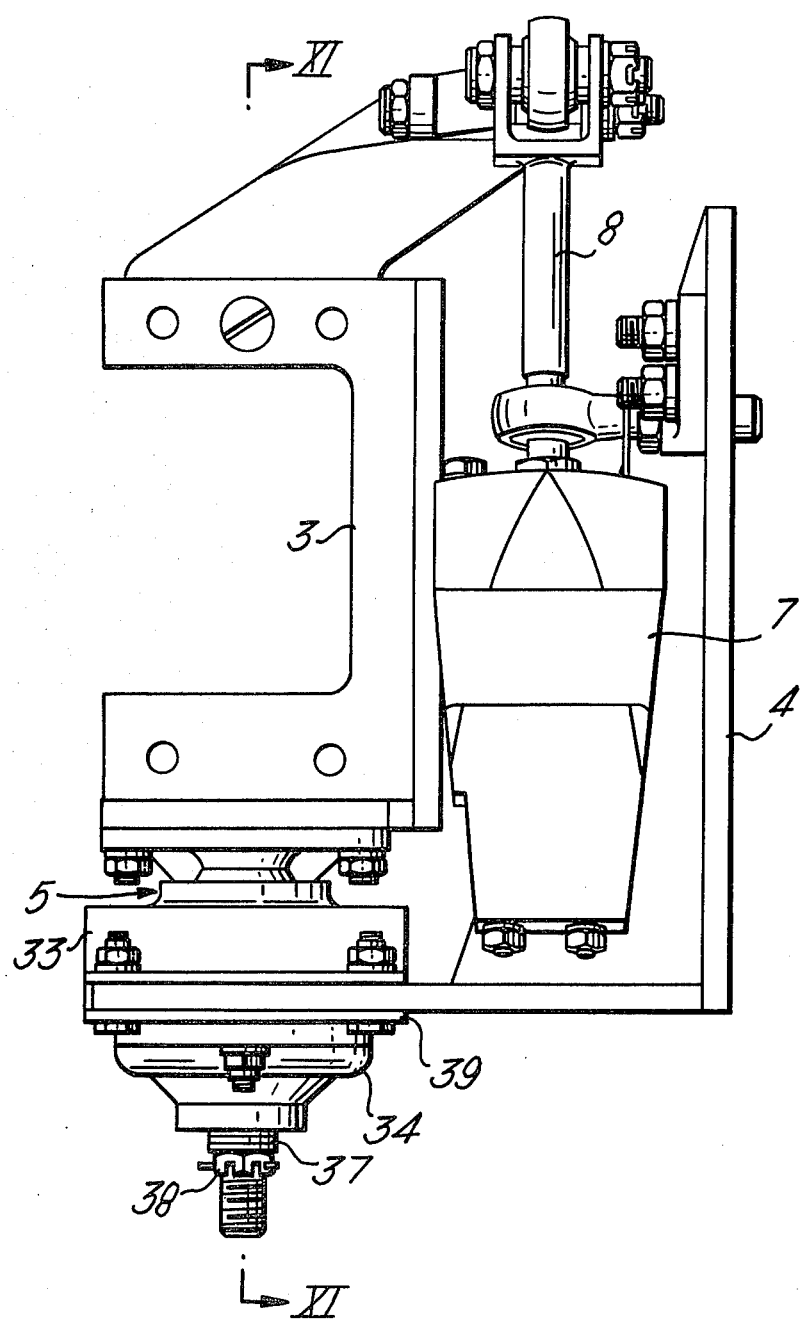
FIG. 10 is an end elevation in the direction of arrows X of FIG. 9.

The pivotal coupling 5 is particularly described with reference to FIGS. 2 to 7. In these Figures, the control support bracket 3 is provided with two pairs of depending lugs 9a, 9b, 9c, 9d, one pair, 9a, 9b, aligned with a roll axis and the other pair 9c, 9d, aligned with a pitch axis. Each lug 9a, 9b is provided with a coaxial bore 10, each bore rotatably receiving one of an opposed pair of arms 11 of a cruciform support element 12. Each lug 9c, 9d is provided with a coaxial bore 13 which surrounds with clearance one of the other opposed pair of arms 14. The control support bracket 3 is thus free to turn with respect to the cruciform support element 12 about the roll axis to an extent dictated by the clearance between bores 13 in lugs 9c, 9d, and arms 14. Arms 14 of the cruciform support element are rotatably received in a pair of coaxial bores provided one in each limb of a spigotted fork member 15 which is attached to the fixed support bracket 4, thereby allowing the cruciform support element to turn with respect to the fixed support bracket 4 about the pitch axis. A part-circular wall 16 upstands from the fixed support bracket 4 and the extent of pitching movement of the cruciform member is dictated by the clearance between arms 11 and the adjacent lip of wall 16. As shown at 17, the clearance can be enlarged by locally reducing the cross-section of one arm 11 (FIG. 4). The other arm 11 is terminated by a length 18 of square cross-section which is received in a slotted member 19 for sliding movement in the pitching plane. This prevents twisting of the control support bracket 3 about a vertical, that is to say a yaw axis, whilst not interfering with movement of the bracket 3 in the pitch and roll planes.

A recess is formed within the circular wall 16 in which recess is housed an annular ring 20 of elastomeric material. A pair of pressure plates 21, 21' overlie the annular ring 20, in a cruciform arrangement one above the other, in respective association with lugs 9c, 9d and 9a, 9b. Each plate 21, 21' is provided with a common central aperture which surrounds the spigotted fork member 15 to allow pivotal movement of the plates 21, 21' with respect to force member 15.

In use, when a control force is applied to the force control stick of the force control stick unit 2, the unit pivots in one or both of the roll and pitch senses. As this occurs, either one or two lugs 9, depending upon the direction of the applied control force, will act on the associated pressure plate 21 and/or 21', and compress the annular ring 20, thus producing a 'feel' characteristic for the assembly. When the control force is removed, the annular ring 20 will expand to restore the force control stick unit 2 to its original, median position. The resilience offered to movement of the force control stick in the pitch and roll senses can independently be varied by local preloading of the annular ring 20. To this end, preloading shims can be placed between the pressure plate 21 or 21' and the annular ring 20.

Figure 11:
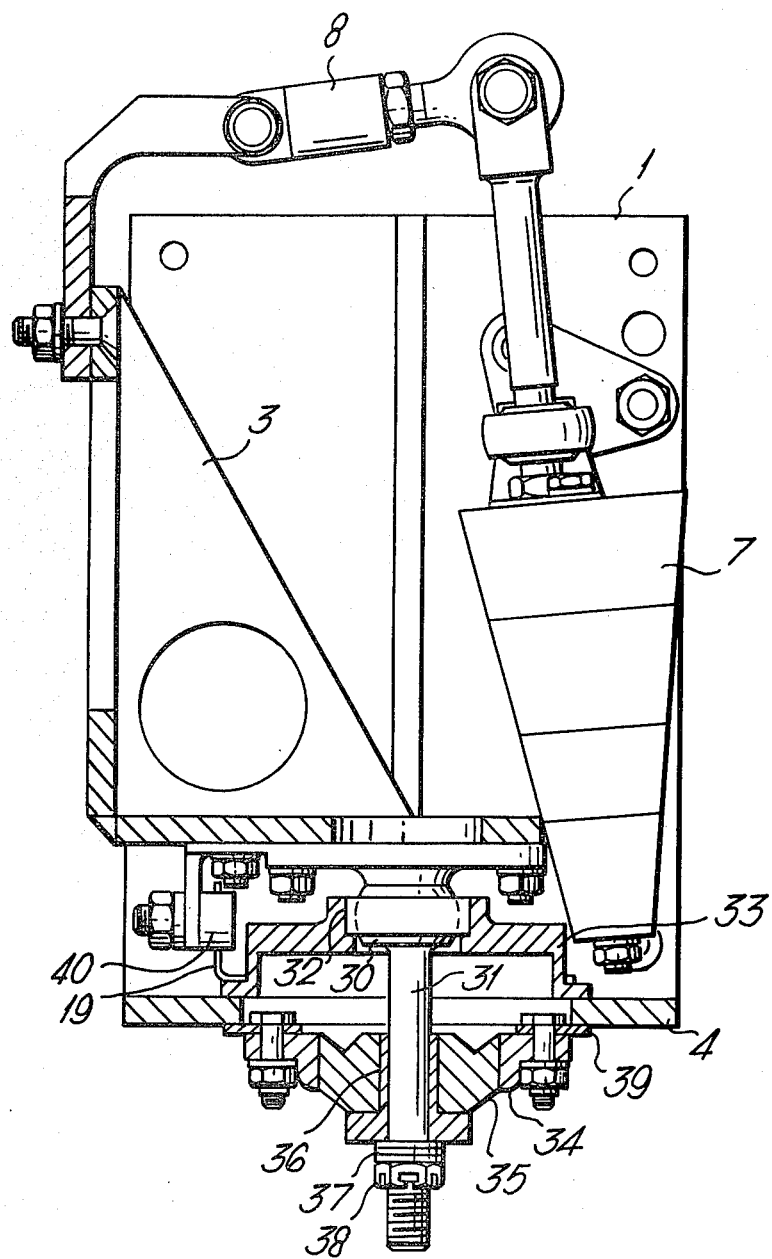
FIG. 11 is a sectional view taken on line XI—XI of FIG. 10.

Referring now to FIGS. 8 to 11, there is shown a second embodiment of force control stick assembly in which some parts are similar to those of the first embodiment. Such parts are given like reference characters and will not be described in detail again. A major difference between the first and second embodiments concerns the pivotal mounting 5. In the second embodiment, the pivotal mounting includes a spherical bearing, rather than the cruciform member employed in the first embodiment. Referring in particular to FIG. 11, the control support bracket 3 carries on its lower portion a part-spherical bearing member 30 integral with a spigot 31 extending away therefrom and threaded at its lower end. Bearing member 30 is pivotally received in a cylindrical race 32 which is secured to the fixed support bracket 4 by a generally cylindrical housing 33.

On the underside of the fixed support bracket 4, there is attached a housing 34 having a cylindrical bore in which is bonded an elastomeric annulus 35, which is provided with a lower portion of frusto-conical form. A sleeve 36 is bonded within the bore of the annulus 35, and the spigot 31 is received within the bore of the sleeve 36. The spigot is held in position by means of washers 37 and a locked nut 38. A spacer plate 39 is located between the housing 34 and the fixed support bracket 4. The compliance of the assembly 1 can be adjusted by varying the thickness of plate 39.

Twisting of the controller support bracket 3 with respect to the fixed support bracket 4 about a vertical (yaw) axis is prevented by attaching a cylindrical stop member 40 to the control support bracket 3, which stop member is slidably engaged in a slotted member 19 attached to the fixed support bracket 4.

Referring to FIG. 8, the angular displacement of the force control stick unit 2 in the pitch and roll senses is limited by means of an annular restraint 41 which is attached to the fixed support bracket 4 by means (not shown).

It will be appreciated that, particularly in the second embodiment of this invention, the elastomeric annulus not only serves to provide a compliant hand control stick assembly, but also serves to reduce or damp vibration of the force control stick unit 2 with respect to the fixed mounting 4.

In addition, in both the above embodiments at least a large proportion of the resilience is generated by compression of an annulus of elastomeric material and therefore the likelihood of catastrophic failure of the embodiments is reduced compared to an arrangement in which resilience is provided by a plurality of coil springs.

I claim:

1. A mounting assembly for a force control member unit of the type described, said mounting assembly being adapted to allow significant sensible displacement of said force control member unit on application of a control force and comprising:
    (1) bracket means for being attached to the body of said force control member unit,
    (2) a fixed member for rigid attachment to a structure,
    (3) pivot means pivotally coupling said bracket means to said fixed member for pivotal movement with respect thereto about a median position, and
    (4) restraining means adapted resiliently to restrain pivotal movement of said bracket means and comprising an element of resiliently deformable material disposed with respect to the fixed member and the bracket means so that on displacement of the bracket means from its median position a portion of said element is compressed thereby to provide a restoring force.

2. A mounting assembly as claimed in claim 1, wherein said restraining means further comprise first and second plate members extending transverse to one another and each having a central opening through which extends a portion of said pivot means and a ring of elastomeric material having spaced portions engaging spaced portions of said first and second plate members on opposed sides of said pivot means, said plate members being disposed to compress portions of said ring of elastomeric material in response to movement of said bracket means from its median position.

3. A mounting assembly as claimed in claim 1, wherein said bracket means is attached to the end of a spigot member, said spigot member having a bearing portion which cooperates with complementary bearing means provided on the fixed member, said spigot having an opposed end region which is surrounded by a ring of elastomeric material, said spigot being disposed to compress portions of said ring to elastomeric material in response to movement of said bracket means from its median position.

4. A force control member assembly according to claim 1, wherein the pivot means allows pivotal movement of the force control member unit about two orthogonal axes but prevents twisting movement about the third orthogonal axis.

5. A force control member assembly according to claim 1 or claim 4, wherein the pivot means includes a cruciform member mounted on the fixed member for turning movement about an axis, the cruciform member carrying the force control member unit for turning movement about an orthogonal axis.

6. A force control member assembly according to claim 1 or claim 4, wherein the pivot means includes a spherical bearing arrangement.

7. A force control member assembly according to claim 1 wherein the resilient member comprises a ring of elastomeric material attached to the fixed member and adapted to be compressed on displacement of the force control member unit from its median position.

8. A force control member assembly according to claim 1, wherein stop means are provided to limit control movement of the force control member unit with respect to the fixed member.

* * * * *